No. 804,573. PATENTED NOV. 14, 1905.
H. BAUMGARTNER.
CONE COUPLING.
APPLICATION FILED JUNE 29, 1904.

Witnesses:

Inventor:
Hugo Baumgartner
by Henry Connett
Attorney

UNITED STATES PATENT OFFICE.

HUGO BAUMGARTNER, OF BASEL, SWITZERLAND.

CONE-COUPLING.

No. 804,573.   Specification of Letters Patent.   Patented Nov. 14, 1905.

Application filed June 29, 1904. Serial No. 214,649.

*To all whom it may concern:*

Be it known that I, HUGO BAUMGARTNER, engineer, a citizen of the Swiss Republic, and a resident of Basel, Switzerland, have invented new and useful Improvements in Cone-Couplings, of which the following is a complete, clear, and exact specification.

The present invention has for its object a cone-coupling which consists, as, in fact, do most cone-couplings already known, of a fast part—that is to say, a part fixed to a revolving axle of the machine and of another portion axially movable on another revoluble part of the machine.

The novelty in the present coupling consists in the mechanisms by means of which the coupling is thrown into or out of action. These mechanisms consist in the main of the following parts: In the nave of the free or axially-movable portion of the coupling a circumferential groove is provided, in which a freely-revoluble slip-ring is placed. In this slip-ring are fixed a number of studs projecting in an axial direction and passing through holes bored in the disk of the fast portion of the coupling. The rotation of the slip-ring must take place with the rotation of the fast portion of the coupling and the free portion of the coupling must always move in an axial direction with the slip-ring. Over the ends of the studs before mentioned projecting beyond the face of the disk of the fast part of the coupling helical springs are placed, which draw the free portion of the coupling toward the fast portion, thereby effecting the closing of the coupling. The opening of the coupling is effected by means of two or more bell-crank levers, each having one radially and one axially directed arm, and which levers, with their radially-projecting arms, lie in front of pins connected to the slip-ring and by their turning in the right direction force backward the slip-ring, together with the free part of the coupling. When the coupling is open, the slip-ring rotates freely on the nave of the pressed-back part of the coupling.

The object of the invention is shown in the accompanying drawings in one form of construction in a coupling for connecting together the ends of two shafts.

Figure 1:
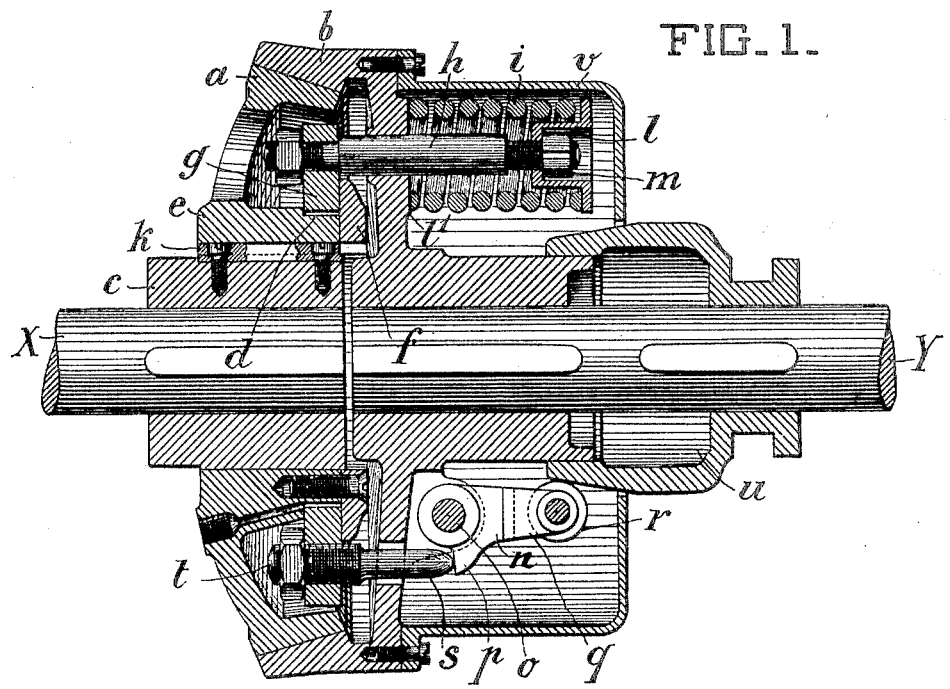
Figure 2:
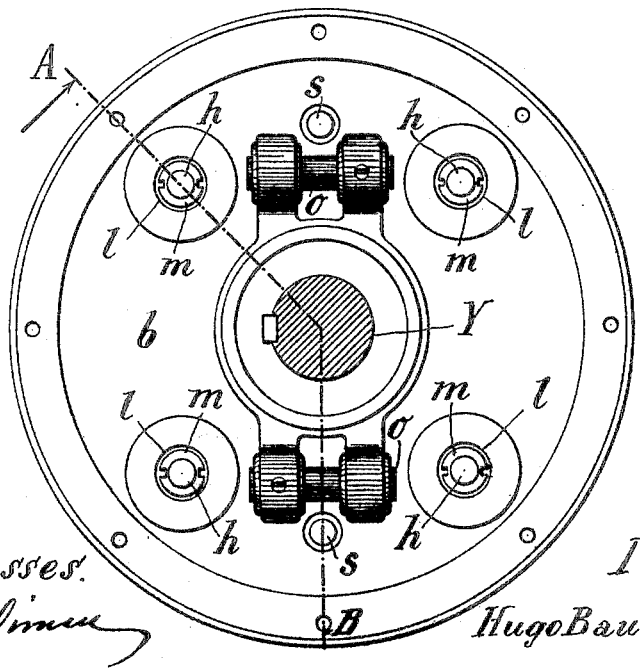

Figure 1 is a longitudinal section on the broken dotted line A B of Fig. 2, which latter shows an end view of the coupling, with the casing of the coupling-springs removed.

$a$ is the part of the coupling which is longitudinally movably arranged on the shaft X, or rather on a bush $c$, keyed upon said shaft, the movement taking place by means of the groove and feather $k$.

$b$ is the part of the coupling which is fixed on the shaft Y and which is provided around its edge with the internally-conical surface.

$d$ is a circular groove formed as a depression in the nave $e$ of the longitudinally-movable coupling portion $a$ and by the screwing on of a ring $f$, which groove serves for the reception of the slip-ring $g$. In this latter are fixed four axially-directed studs $h$, provided with screw-threads on their free ends. Through the disk of the fast part $b$ of the coupling four holes are bored, through which the studs $h$ project. Over the parts of the studs $h$, projecting on the far side of the disk of the coupling portion $b$ helical coupling-springs $i$ are placed, said springs being under compression by means of the nuts $m$ between the washers $l$ and the bearing-face $l'$. By means of these springs the pressing together of the parts of the coupling is effected.

$n$ represents bell-crank levers arranged to turn on the pins $o$ in the fast portion of the coupling and each having one radially-directed arm $p$ and one axially-directed arm $q$. The latter arm is provided with a revoluble roller $r$. In front of the radially-directed arms $p$ axially-movable pins $s$ project through the disk of the fast portion of the coupling, said pins being screwed into the slip-ring $g$ and being adjustable or removable in their longitudinal direction by means of the screw-thread $t$.

$u$ is a partly-conical and partly-cylindrical box for the operation of the bell-crank levers $n$, and $v$ is a protecting-casing.

When the box $u$ is brought into the position shown in the drawings, the coupling is engaged as the coupling-springs $i$ hold the movable part $a$ of the coupling tightly in engagement with the other part $b$, so that the conical surfaces are pressed together and the coupling is closed. If the box $u$ is moved toward the left, Fig. 1, the axially-directed arms $q$ of the bell-crank levers $n$ are separated, and by said levers the pins $s$, with the slip-ring $g$ and the longitudinally-movable part $a$ of the coupling, are moved backward. The coupling is thus opened and remains in this condition, in which the rollers $r$ of the bell-crank levers $n$ rest upon the cylindrical surface of the box $u$ until this latter is again moved away.

What I claim is—

1. In a cone-coupling, the combination of two coupling parts provided with conical engaging faces the one fixed and the other axially movable, of a slip-ring which is revolubly placed in an annular groove in the axially-movable portion of the coupling, of studs fixed in the said slip-ring and which project through a disk-shaped part of the fixed portion of the coupling, of coupling-springs arranged on the said studs for drawing the axially-movable part of the coupling into the fixed part, of pins rigidly projecting from the slip-ring, of bell-crank levers movably arranged opposite the said pins in the fast portion of the coupling and of a movable disengaging box for the pressing out of the bell-crank levers with the object of moving back the pins and of opening the coupling, substantially as hereinbefore described.

2. In a cone-coupling, the combination of two coupling parts provided with conical engaging faces the one fixed and the other axially movable, of a slip-ring which is revolubly placed in an annular groove in the axially-movable portion of the coupling, of studs fixed in the said slip-ring and which project through a disk-shaped part of the fixed portion of the coupling, of coupling-springs arranged on the said studs for drawing the axially-movable part of the coupling into the fixed part, of adjustable pins fixed in the slip-ring, of bell-crank levers pivoted in the fast portion of the coupling opposite said pins and carrying rollers at one of their ends, and of a partly-conical and partly-cylindrical disengaging-box which is capable of longitudinal movement and which can be forced between the ends of the bell-crank levers provided with the rollers thereby moving said ends outward and holding them in their outward position with the object of effecting the forcing backward of the pins and the opening of the coupling, substantially as hereinbefore described.

In witness whereof I have hereunto signed my name, this 16th day of June, 1904, in the presence of two subscribing witnesses.

HUGO BAUMGARTNER.

Witnesses:
GEO. GIFFORD,
AMAND BRAUN